US009135408B2

United States Patent
Chu et al.

(10) Patent No.: US 9,135,408 B2
(45) Date of Patent: Sep. 15, 2015

(54) METHOD AND DEVICE FOR MANAGING AUTHORIZATION OF RIGHT OBJECT IN DIGITAL RIGHTS MANAGMENT

(75) Inventors: Youn-Sung Chu, Gyeonggi-Do (KR); Seung-Jae Lee, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 1069 days.

(21) Appl. No.: 12/372,825

(22) Filed: Feb. 18, 2009

(65) Prior Publication Data

US 2009/0228960 A1 Sep. 10, 2009

Related U.S. Application Data

(60) Provisional application No. 61/029,838, filed on Feb. 19, 2008, provisional application No. 61/030,551, filed on Feb. 21, 2008, provisional application No. 61/044,461, filed on Apr. 11, 2008.

(30) Foreign Application Priority Data

Jun. 13, 2008 (KR) .................. 10-2008-0055959

(51) Int. Cl.
   G06F 21/00 (2013.01)
   G06F 15/16 (2006.01)
   G06F 21/10 (2013.01)

(52) U.S. Cl.
   CPC ...................................... G06F 21/10 (2013.01)

(58) Field of Classification Search
   CPC .............. H04L 63/10; H04L 2463/101; H04L 2209/603; H04L 9/3263; H04L 9/3268; H04N 21/2541
   See application file for complete search history.

(56) References Cited

U.S. PATENT DOCUMENTS

| 7,437,551 B2 * | 10/2008 | Chan et al. ..................... 713/158 |
| 2002/0032903 A1 * | 3/2002 | Sprunk ............................. 725/1 |

(Continued)

FOREIGN PATENT DOCUMENTS

| CN | 1658554 A | 8/2005 |
| CN | 1728039 A | 2/2006 |

(Continued)

OTHER PUBLICATIONS

Koster et al; Introduction of the Domain Issuer in OMA DRM; DRM Workshop CCNC 2007; Philips Research © Jan. 11, 20007.*

(Continued)

*Primary Examiner* — Luu Pham
*Assistant Examiner* — Jahangir Kabir
(74) *Attorney, Agent, or Firm* — Birch, Stewart, Kolasch & Birch, LLP

(57) ABSTRACT

Provided is a method for managing an authorization of digital rights, the method performed by a first server and comprising: receiving from a second server a drop domain authorization trigger message for an initiation of an authorization protocol to cease creating a domain rights object (RO) for a domain for which the first server has an authorization to create the domain RO, the trigger message including information on the domain; the domain being managed by the second server and the authorization being obtained by the first server from the second server checking status of the authorization; transmitting to the second server, a drop domain authorization request message including the ID of the domain; and receiving from the second server, a drop domain authorization response message including a status element indicating a result of processing of the request message based on content included in the request message.

8 Claims, 6 Drawing Sheets

(56) References Cited

U.S. PATENT DOCUMENTS

| | | |
|---|---|---|
| 2005/0021948 A1 | 1/2005 | Kamperman |
| 2005/0182727 A1 | 8/2005 | Robert et al. |
| 2006/0020790 A1* | 1/2006 | Sprunk ............ 713/167 |
| 2006/0031164 A1* | 2/2006 | Kim ................. 705/51 |
| 2006/0056324 A1* | 3/2006 | Hyyppa et al. ........ 370/310 |
| 2006/0107334 A1 | 5/2006 | Leone et al. |
| 2008/0010209 A1* | 1/2008 | Lee et al. ............ 705/59 |
| 2008/0028450 A1* | 1/2008 | Zhao et al. ........... 726/6 |
| 2008/0172719 A1* | 7/2008 | Zhang et al. .......... 726/1 |
| 2009/0132713 A1* | 5/2009 | Dutta et al. ........... 709/227 |
| 2009/0217036 A1* | 8/2009 | Irwin et al. ........... 713/168 |
| 2010/0306548 A1* | 12/2010 | Kravitz ............. 713/182 |

FOREIGN PATENT DOCUMENTS

| | | |
|---|---|---|
| CN | 1773519 A | 5/2006 |
| KR | 10-2007-0063000 A | 6/2007 |
| KR | 10-2008-0013723 A | 2/2008 |
| KR | 10-0819495 B1 | 3/2008 |
| KR | 10-0830941 B1 | 5/2008 |
| WO | WO 2006/117555 A2 | 11/2006 |
| WO | WO 2007/142491 A1 | 12/2007 |
| WO | WO 2008/002029 A1 | 1/2008 |

OTHER PUBLICATIONS

A certificate revocation scheme for a large-scale highly replicated distributed system, Popescu et al, IEEE, Jul. 2003.*

Role-based security for distributed object systems, Yialeliset al, IEEE, Jun. 1996.*

Open Mobile Alliance, "Secure Content Exchange Architecture", Draft Version 0.9, OMA-AD-SCE-V0_9_0-20070423-D, Apr. 23, 2007 (downloaded by EPO on Oct. 13, 2011), 29 pages provided.

Soyoung Jeong et al: "SCE: Registration protocol between DA and RI, OMA0DLDRM-2006-0362R02-CR_SCE_AD_DA_RI_Registration", Sep. 19, 2006, pp. 1-5, Open Mobile Alliance Ltd.

Open Mobile Alliance, "SCE User Domains", Draft Version 0.8.1, Jun. 11, 2008, OMA-TS-SCE_DOM-V0_8_1-20080611-D, pp. 1-63.

* cited by examiner

METHOD AND DEVICE FOR MANAGING AUTHORIZATION OF RIGHT OBJECT IN DIGITAL RIGHTS MANAGMENT

The present application claims the priority benefits of U.S. Provisional Applications Nos. 61/029,838, 61/030,551 and 61/044,461 respectively filed on Feb. 19, 2008, Feb. 21, 2008 and Apr. 11, 2008, and Korean Patent Application No. 10-2008-0055959 filed on Jun. 13, 2008 in Republic of Korea. The entire contents of these applications are herein fully incorporated by reference.

TECHNICAL FIELD

The present invention relates to a Digital Rights Management (DRM), and more particularly, to a method and device for managing authorization to issue a Domain Rights Object (Domain RO) between devices (entities) in the DRM system.

BACKGROUND ART

A Digital Rights Management (DRM) system is a technology for securely protecting and systematically managing a rights object of digital contents, and provides a series of protection and management systems related to the prevention of illegal copy of digital contents and acquisition of rights object of the digital contents, generation and circulation of the digital contents, and procedures of use of the digital contents.

FIG. 1 is a schematic view of a digital rights management system. The digital rights management system controls digital contents provided from a contents provider to a user such that the user is able to use the digital contents as much as rights object granted to the user. Here, the contents provider is an entity corresponding to a Contents Issuer (CI) and/or a Rights Issuer (RI).

The Contents Issuer (CI) issues contents protected using a specific encoding key so as to protect the contents from users having no access rights, and the Rights Issuer (RI) issues Rights Object (RO) required to use the protected contents.

A DRM agent installed in a device (or a terminal) receives the protected contents and rights object, and controls a use of the contents by analyzing a license included in the rights object and converting the protected contents into a form suitable for being used in a corresponding terminal.

A Domain Authority/Domain Enforce Agent (DA/DEA) is an entity for managing and controlling a user domain. That is, the DA defines a Domain Policy for the user domain, and the DEA is an entity for performing the domain policy defined by the DA and may be positioned in a network or in a device within the domain.

FIG. 2 is an overview showing exemplary user domain architecture in DRM. FIG. 2 shows an exemplary framework for a Share-key management in a User Domain key Management scheme.

Differently from the concept of a domain in the related art OMA DRM technology, the user domain is configured such that the RI only performs a function of issuing a Domain Rights Object, and the DA/DEA performs a function of managing Domain Members. The user domain members (i.e., devices joined to the user domain) may share rights objects issued from different service providers through copy, move, and the like.

Referring to FIG. 2, if the device (or DRM agent) requests to join a corresponding user domain through a Join Domain Request message, the DA/DEA verifies (checks) the device (DRM agent) and securely transfers a Master Domain Key (MDK) to the terminal. Here, the DA/DEA performs an encryption on the MDK using the device's public key. All devices joined in the specific user domain may share the same MDK.

The DA/DEA securely issues, to the RI, a Diversified Domain Key (DDK) derived from the MDK. The DDK is used to encrypt a Rights Object Encryption Key (REK) of the domain rights object. The DA/DEA additionally issues a Validation Token (so called, V-Token) such that a member of the user domain, having received the RO, verifies the reliability of the RI. This V-Token includes information, such as a term or condition of a contract between the DA/DEA and the RI. Therefore, the device (e.g., DEV1 in FIG. 2) may verify through such information whether or not the RO transferred from the RI is valid (usable).

The device may obtain the DDK by deriving the MDK issued by the DA/DEA, and may use the DDK to use the RO (i.e., domain RO) issued from the RI. Here, before the RO is used, the device may verify through the V-Token whether the RO is valid. Meanwhile, if the terminal (e.g., DEV1) desires to share the RO with another terminal (e.g., DEV2) as a member of the user domain, the terminal (i.e., DEV1) may transfer a DRM Contents Format (DCF), the RO, and the V-Token to said another terminal (i.e., DEV2) for sharing.

FIG. 3 is a schematic block diagram showing a process of creating a domain RO by an RI in a user domain.

Referring to FIG. 3, if the device 1 (or DRM Agent 1) requests an RO from the RI (S1), the RI checks an ID of a corresponding user domain (e.g., in FIG. 3, a domain where the devices 1, 2 and 3 are joined), and requests domain information, the V-Token (or User Domain Token) and a key (DDK or DDK-set) from the DEA (Use Domain Request in FIG. 3) (S2). The RI receives a response to the request from the DEA (Use Domain Response in FIG. 3) (S3). After creating (generating) a user domain RO based on the information received from the response in step (S3), i.e., the DDK and V-Token, the RI issues the generated RO to the device 1 (RO Response in FIG. 3) (S4).

DISCLOSURE OF THE INVENTION

Therefore, it is an object of the present invention to define a detailed parameter of an RDP Use Domain protocol and an RDP Drop Domain protocol. The RDP Use Domain protocol refers to a protocol between a DEA and an RI in which the DEA transfers, to the RI, a corresponding authorization, domain information, a key material (e.g., DDK or DDK-set) required to generate a Domain RO, etc. such that the RI creates an RO. The RDP Drop Domain protocol refers to a protocol between a DEA and a specific RI to restrict authorization (rights) to issue a RO, which has already been issued to the RI, such that the RI is disabled to create the domain RO.

To achieve this object, there is provided a method for managing authorization in a digital rights management according to the present invention, including:

(A) sending, by a first entity, to a second entity a trigger message by including first information for terminating authorization to issue a domain RO for a specific domain therein;

(B) receiving, by the first entity, from the second entity a Drop Domain Request message including second information related to the termination of the authorization to issue the domain RO; and (C) sending, by the first entity, to the second entity a Drop Domain Response message including third information related to the termination of the authorization to issue the domain RO.

Preferably, the method further includes receiving, by the second entity, from a terminal a message requesting a domain

RO issuance; and sending, by the second entity, to the terminal a response message for the request of the domain RO issuance.

Preferably, the method further includes updating, by the second entity, its authorization to issue a domain RO by using the third information.

Preferably, the first information consists of a resID parameter indicating an identity (ID) of the first entity, a reqURL parameter indicating an address of the first entity, and a domID parameter indicating an ID of a user domain in which authorization to issue a domain RO is to be terminated.

Preferably, the second information consists of a reqID parameter indicating an identity (ID) of the second entity, a resID parameter indicating an ID of the first entity, and a reqInfo parameter including user domain information about the termination of the authorization to issue a domain RO and an <unauthorized> element.

Preferably, the third information consists of a reqID parameter indicating an ID of the second entity, a resID parameter indicating an ID of the first entity, and a resInfo parameter including user domain information about a termination of authorization to issue a domain RO, and a user domain token indicating a presence or absence of authorization to issue a domain RO.

Preferably, the step (B) comprises: checking whether or not the second entity has authorization to issue a domain RO for the domain; and notifying, to the first entity, through the <unauthorized> element that the second information in the request message does not have the authorization to issue the domain RO for the domain if the second entity is checked not to have the authorization to issue the domain RO.

Preferably, the step (B) comprises: checking whether or not the second entity has authorization to issue a domain RO for the domain; and removing, by the second entity, information related to the domain if the second entity is checked to have the authorization to issue the domain RO; and sending, to the first entity, the request message including the second information by using an address indicated by the reqURL parameter included in the trigger message.

Preferably, the third information is a status element which is set to either 'success' or 'fail.'

Preferably, the method further includes checking, by the second entity, a value of the status element included in the drop domain response message; and removing, by the second entity, a user domain context including at least one of user domain information, a key material, and a user domain token if the value of the status element is checked 'success.'

Preferably, in the step (C), if the first entity has successfully received the drop domain request message or if the first entity has successfully checked or updated status information about a function to create and issue a user domain RO of the second entity after receiving the drop domain request message, the first entity transmits the response message by including a 'status' element which is set to 'success' therein.

Preferably, in the step (C), if the first entity has failed to receive the drop domain request message or if the first entity has failed to check or update status information about a function to create and issue a user domain RO of the second entity, the first entity transmits the response message by including a 'status' element which is set to 'fail' therein.

In order to achieve this object, there is provided a method for managing authorization in digital rights management according to the present invention, including: sending, by a first entity, to a second entity a drop domain request message including information about authorization to issue a domain RO; receiving, by the first entity, from the second entity a response message including a status element about the authorization to issue the domain RO; and checking, by the first entity, a value of the status element, and removing a user domain context according to the value of the status element.

Preferably, the method further includes receiving, by the first entity, from the second entity a trigger message for performing a protocol to terminate the authorization to issue the domain RO.

In order to achieve this object, there is provided a device for managing authorization in a digital rights management according to the preset invention, in which authorization to issue a domain RO for a specific domain is given to an entity of a DRM, including: a module performing a protocol for terminating the authorization to issue the domain RO, wherein the module sends a trigger message requesting an initiation (start) of the protocol to the entity; receives a message requesting a termination (stop) of the authorization to issue the domain RO from the entity; searches whether or not the received request message includes information indicating the presence or absence of the authorization to issue the domain RO in the entity; and based on the search result, sends to the entity a response message containing information to indicate an update of the authorization to issue the domain RO.

EFFECT

The present invention performs a newly defined RDP Drop domain protocol between the RI and the DA/DEA, thereby terminating authorization (rights) to create and issue a domain RO for a specific domain in digital rights management. Therefore, the present invention may effectively manage the authorization to create and issue the domain RO for a user domain in digital rights management.

MODES FOR CARRYING OUT THE PREFERRED EMBODIMENTS

Figure 1:
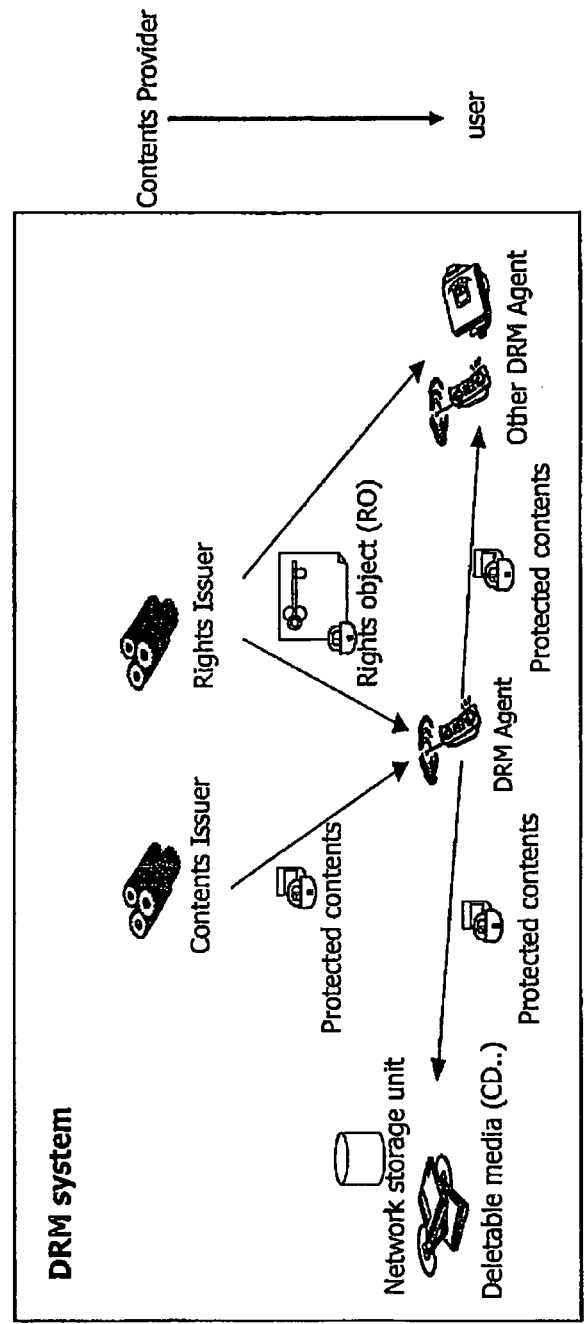
FIG. 1 is a schematic view of a digital rights management system.
Figure 2:
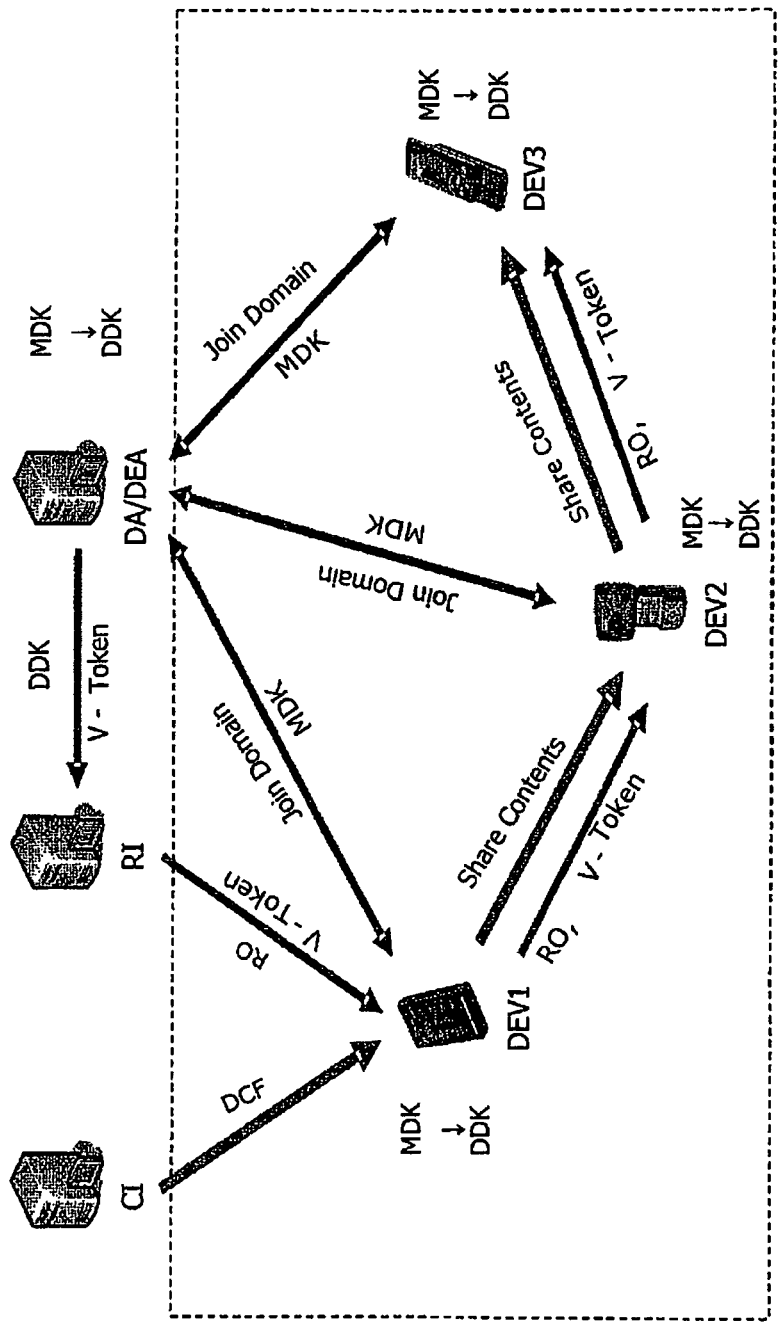
FIG. 2 is an overview showing exemplary user domain architecture in DRM.
Figure 3:
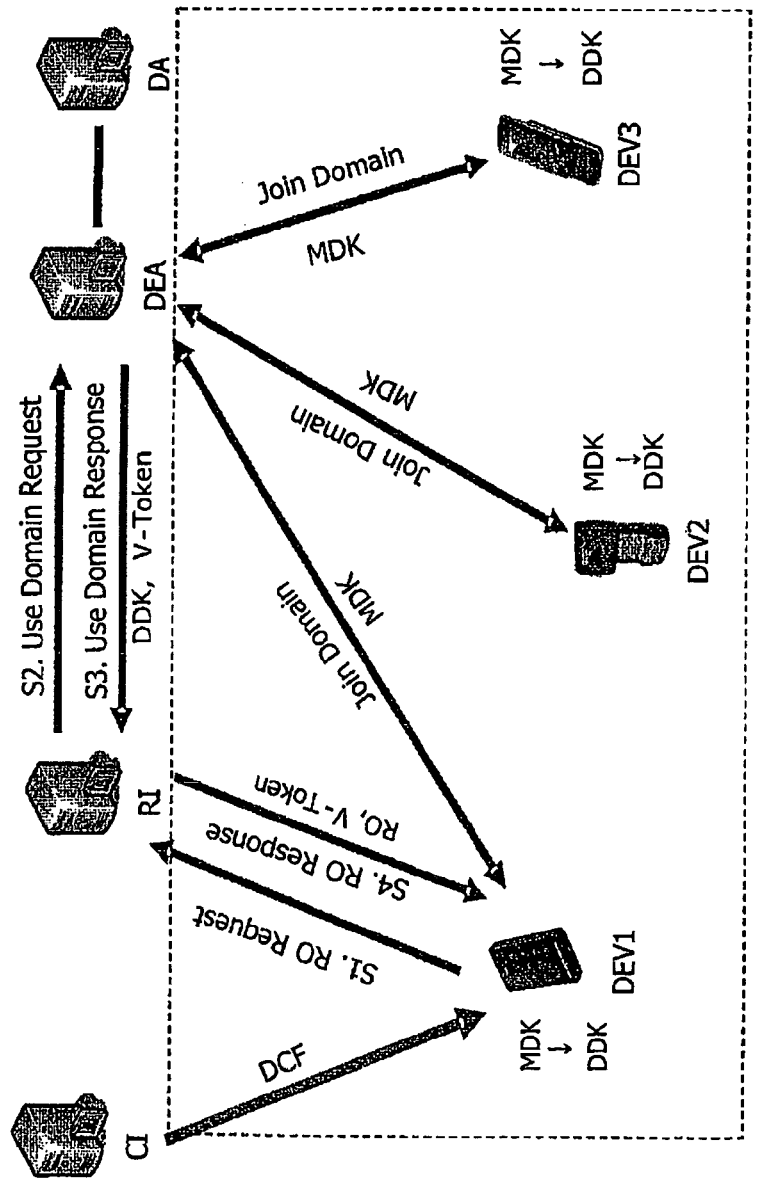
FIG. 3 is a schematic block diagram showing a process of creating a domain RO by an RI in a user domain.

The present invention is applied to a Digital Rights Management (DRM) system. However, the present invention is not limited to the DRM system, and may also be applied to all communication systems and methods to which the technical scope of the present invention may be applied.

The basic concept of the present invention is that a RDP Drop domain protocol between DA/DEA and RI is newly defined in a DRM system so as to disable an RI's authorization to create and issue a domain RO for a specific user domain, thus to effectively manage authorization in the DRM system.

Hereinafter, descriptions of technical terms used in the present invention will be given. Terms used in the present invention is to merely explain specific embodiments, thus it is not meant to be limiting.

The terminal (or device) according to the present invention refers to all types of devices capable of performing the technical characteristics of the present invention. That is, the terminal according to the present invention may perform a function of setting an IP tunnel with a network, and transmit a network node and data through the setup IP tunnel, such as a mobile communication terminal (e.g., User Equipment (UE), a cellular phone, a portable terminal, a DMB phone, a gaming phone, a camera-equipped phone, a smart phone, and the like), a notebook, a desktop computer, a Personal Digital Assistant (PDA), general home appliances and the like.

The DRM agent according to the present invention may be configured as one device of the terminal, serving as a module (e.g., a device comprised of software and hardware) performing functions related to the digital contents management. In the description of the present invention, the DRM agent and the terminal will be used without any distinction.

The User Domain Token is a so called Validation Token (V-Token). The User Domain Token is used by the DA/DEA to authorize certain entities (e.g., RI, LRM, or the like) to perform certain tasks (e.g., to issue RO to devices) in relation to the User Domain. The User Domain Token consists of an identity (ID) of the entity, the authorized roles of the entity, an expiration date and a digital signature.

The Key Material is key information required to generate (create) a user domain RO, and includes DDK and DDK-set.

The Diversified Domain Key (DDK) is a value obtained by performing a hashing on a Master Domain Key (MDK) shared by the DA/DEA and a device (or DRM agent), and the MDK cannot be derived by an RI having received the DDK.

For the DDK-set, both the MDK and the DDK for the user domain are changed if a user domain upgrade is performed. In this instance, devices as a member of the user domain may receive a MDK of the most recent generation if a hash chain is supported, and derive a previous MDK from a hash chain. On the contrary, since the hash chain is not applied to the DDK, all DDKs of a previous domain generation should be transferred. Accordingly, when a domain RO of multiple domain generations is to be created, the DDK-set is transmitted.

The signature provides a digital signature for all messages, integrity and authenticity of the message.

In the RDP Drop domain protocol, an RDP Trigger{Drop Domain} message is a trigger message of a RDP Drop domain protocol. The Drop Domain Request message is a message for requesting a drop or termination (stop) of the authorization to create and issue a RO, and is sent from a RI to a DA/DEA. The Drop Domain Request message is the first message in the 2-pass RDP Drop domain protocol for disabling a certain RI to create RO (i.e., RO for the user domain).

A Drop Domain Response message is a response message for the Drop Domain Request message, and includes information related to the authorization to create and issue the RO.

Hereinafter, descriptions of the exemplary embodiment of the present invention will be given with reference to the accompanying drawings.

Figure 4:
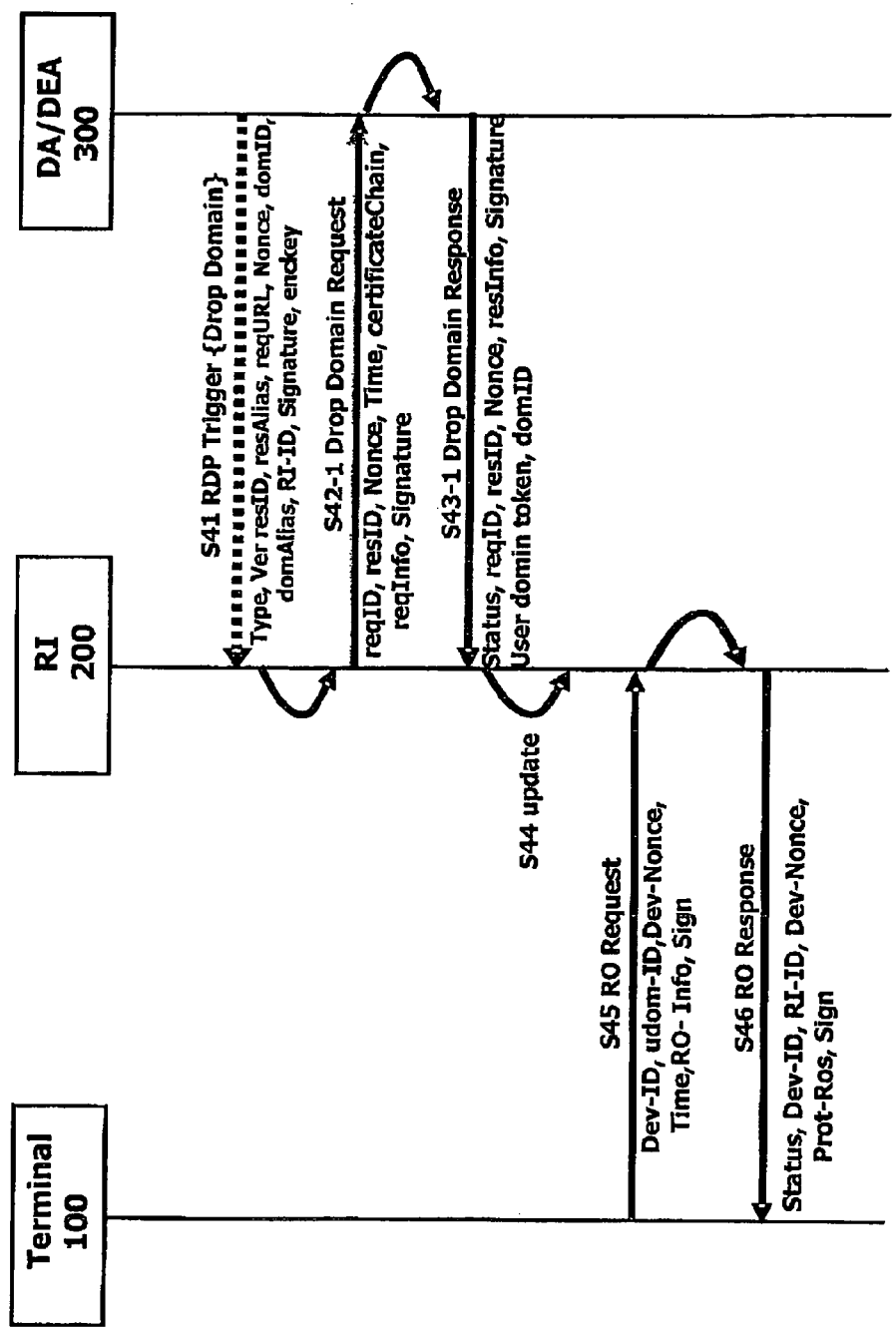
FIG. 4 is a signal flowchart showing a RDP Drop domain protocol according to a first exemplary embodiment of the present invention.
Figure 5:
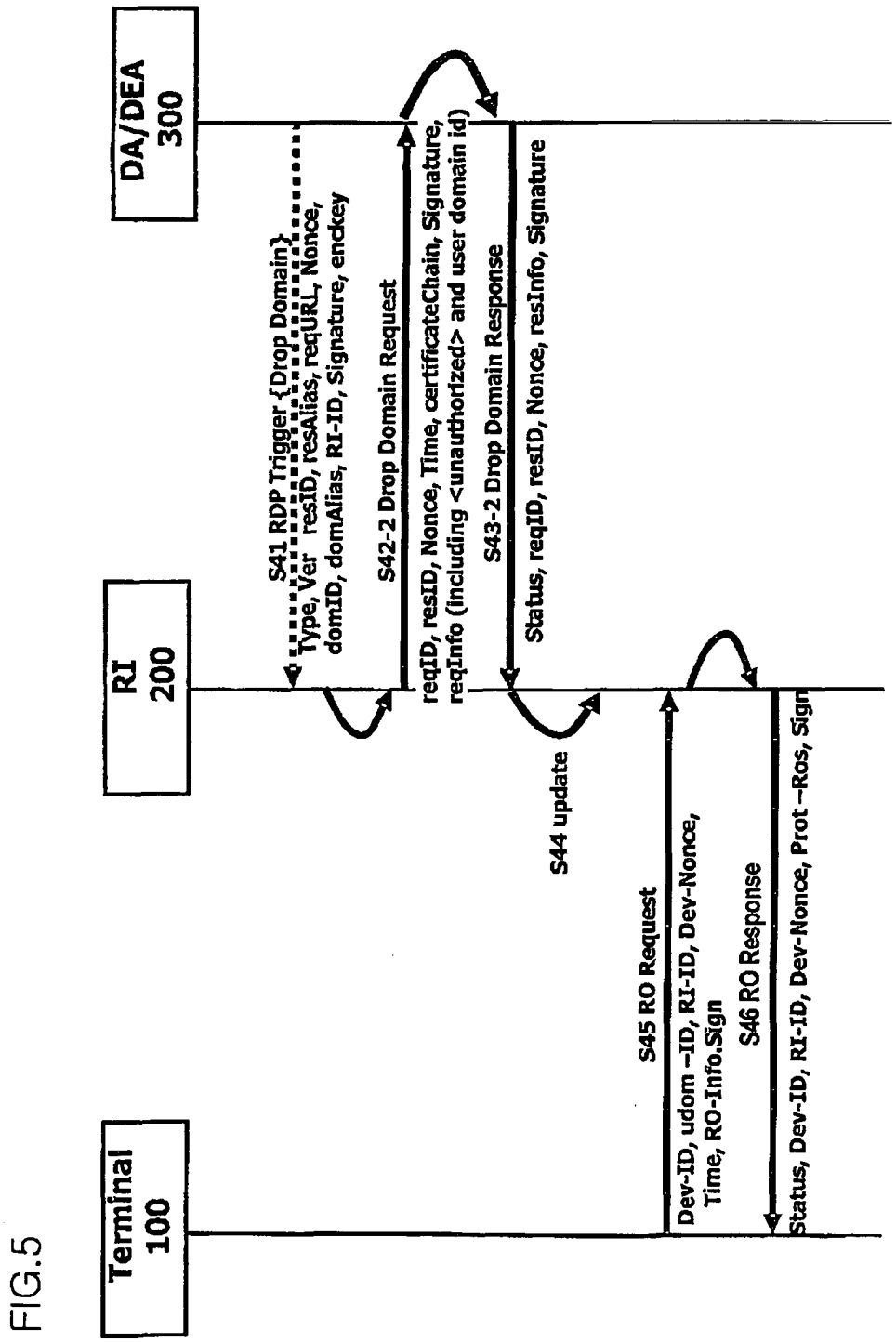
FIG. 5 is a signal flowchart showing a RDP Drop domain protocol according to a second exemplary embodiment of the present invention.

FIGS. 4 and 5 are respective signal flowcharts showing a RDP Drop domain protocol. Here, FIG. 4 shows a case in which the RI 200 has normally authorization to create and issue a user domain RO according to a first exemplary embodiment of the present invention, and FIG. 5 shows a case in which the RI 200 does not have authorization to create and issue a user domain RO (e.g., it has already dropped or does not have the authorization to create the user domain RO) according to a second exemplary embodiment of the present invention.

Hereinafter, the description of the exemplary embodiment of the present invention will be given with reference to FIG. 4.

There may be a case when the DA/DEA 300 desires to deprive an RI 200 of the authorization to create RO of a user domain managed by the DA/DEA 300. In this case, the DA/DEA 300 transfers a trigger message (i.e., RDP Trigger{Drop Domain}) to the RI 200 so as to request the drop of the authorization to create the user domain RO (S41). The trigger message (RDP Trigger{Drop Domain}) includes information (parameter, element or attribute) for performing a RDP Drop domain protocol: that is, type, version, proxy, resID, resAlias, reqURL, nonce, domID, domAlias, RI-ID, signature, and encKey. Among these information, the 'resID' is a parameter (element or attribute) indicating an ID of the DA/DEA (if the DA/DEA is a single entity) or a DEA ID (if the DA/DEA is separated); the 'reqURL' is a parameter (element or attribute) indicating a URL of the DA/DEA (if the DA/DEA is a single entity) or a DEA URL (if the DA/DEA is separated); and the 'domID' includes information related to a user domain ID managed by the DEA, and information notifying the drop of the authorization to create and issue the user domain RO.

After receiving the RDP Trigger{Drop Domain}, the RI 200 checks its authorization to create and issue the user domain RO. Then, the RI 200 transmits a drop domain request message (i.e., Drop Domain Request in FIGS. 4 and 5) to the DEA 300 (S42-1 in FIG. 4 and S42-2 in FIG. 5). Here, the RI 200 has normal authorization to create and issue the user domain RO.

Accordingly, the RI 200 removes information about a corresponding user domain (domain information, key material, and the like), and then transfers the Drop Domain Request message to an address which is indicated by the reqURL (i.e., information indicating the address of the DA/DEA) included in the RDP Trigger{Drop Domain} (S42-1). The Drop Domain Request message includes ID information of a user domain required by the RI 200 to expire (disable) the authorization to create and issue RO, i.e., reqID, resID, nonce, time, certificateChain, reqInfo, and signature. Among these information, the 'reqID' is a parameter (element or attribute) indicating an ID of a RI which is to drop the authorization to create and issue a domain RO, the 'resID' is a parameter (element or attribute) indicating an ID of the DA/DEA (if the DA/DEA is a single entity) or a DEA ID (if the DA/DEA is separated), and the 'reqInfo' is a parameter (element or attribute) containing information about a user domain from which the DA/DEA requests the expiry of the authorization to create a domain RO. That is, the reqInfo parameter basically includes a user domain ID (i.e., a sub-element of the reqInfo), and may additionally include a user domain alias.

Upon receiving the Drop Domain Request message, the DA/DEA 300 transmits a Drop Domain Response message to the RI 200 (S43-1 in FIG. 4 and S43-2 in FIG. 5). The Drop Domain Response message contains information (parameter, element or attribute) to perform an RDP Drop domain protocol: that is, status, reqID, resID, nonce, resInfo, and signature. Among these information, the 'reqID' element (parameter) is information indicating an ID of a RI which is to drop the authorization to create and issue a domain RO, the 'resID' element is information indicating an ID of the DA/DEA (if the DA/DEA is a single entity) or a DEA ID (if the DA/DEA is separated), and the 'resInfo' element includes user domain information and a User Domain Token. Here, the user domain information includes a 'user domain ID,' an 'expiry time of a Domain Context' and a 'user domain alias.'

Upon receiving the Drop Domain Request message, the DA/DEA 300 checks (searches) whether or not an <unauthorized> element as a sub-element is included in the <reqInfo> element of the message. If the <unauthorized> element as a sub-element is not included in the <reqInfo> element, it indicates that the RI 200 has removed the authorization to create and issue the user domain RO bound to the DA/DEA 300 for a corresponding user domain. Therefore, the DA/DEA 300 updates current status information about the authorization to create and issue the corresponding user domain RO. For instance, it is updated from an 'enabled to issue RO' status (so called, 'Enable') to a 'disabled to issue RO' status (so called, 'Disable').

The DA/DEA 300 uses a user domain token (i.e., V-Token) so as to transfer to the RI 200 information notifying the expiry of the authorization to create the user domain RO through the Drop Domain Response message, and requests the RI 200 to update the authorization for a RO (S43-1). In the Drop Domain Response message in step (S43-1), the RI 200 includes the user domain token and the domain ID.

In addition, if the Drop Domain Request message has been successfully received or if the status information about the authorization to create and issue the user domain RO of the RI 200 has been successfully checked or updated after receiving the Drop Domain Request message, the DA/DEA 300 transmits a Drop Domain Response message by including a 'Status' element (or parameter) which is set to 'Success' therein. Conversely, if the Drop Domain Request message has not been successfully received or if the status information about the authorization to create and issue the user domain RO of the RI 200 has not been successfully checked or updated, the DA/DEA 300 transmits a Drop Domain Response message by including a 'Status' element (or parameter) which is set to 'Fail' therein.

Based on the received Drop Domain Response message, the RI 200 checks the value of the 'Status' element (Success or Fail) included in the Drop Domain Response message. Here, if the value of the 'Status' element is checked to be 'Success,' the RI 200 removes a User Domain Context which includes at least one of 'User Domain Info', 'Key Material', and 'User Domain Token,' such that the RI 200 cannot issue the user domain RO. Thusly, the RI 200 receives the Drop Domain Response message, and removes (updates) its authorization on the RO based on the information (e.g., the Status element) contained in the received message (S44).

Similar to steps (S41~S44), after the RDP Drop domain protocol is performed, there may be a case in which a terminal 100 as a member of the user domain requests to create and issue an RO from the RI 200, which has already dropped the authorization to create and issue the user domain RO (RO Request message in FIG. 4) (S45). The RI 200 informs the terminal 100, through an RO Response message, that it is not able to create and issue the RO (S46). Here, the value of the 'Status' element included in the RO Response message is set to 'Fail.'

Hereinafter, descriptions of a second exemplary embodiment in FIG. 5 will be given in detail. Descriptions which are the same as the first exemplary embodiment in FIG. 4 are omitted, and descriptions which are different from the exemplary embodiment in FIG. 4 (i.e., S42-2 and S43-2) will be given. Therefore, same reference numerals in FIGS. 4 and 5 are used to have the same functions and operations. In particular, the second exemplary embodiment in FIG. 5 illustrates that the RI 200 does not have normal authorization to create and issue a user domain RO (e.g., it has already dropped or does not have the authorization to issue a user domain RO).

That is, in the trigger message in step (S41), there may be a case in which the RI 200 does not have the authorization to create RO since the authorization to create the user domain RO has already been dropped or expired (e.g., expiry of time or condition). In this instance, if the DA/DEA 300 sends a RDP Trigger{Drop Domain} to the RI 200, the RI 200 may inform, through an extension of the Drop Domain Request message, that the authorization to create the user domain RO has already been dropped or expired. That is, the RI 200 transmits the Drop Domain Request message to an address indicated by a reqURL (i.e., information indicating an address of the DA/DEA) included in the RDP Trigger{Drop Domain} (S42-2). The Drop Domain Request message may include ID information of the user domain required by the RI 200 to expire (disable) the authorization to create and issue the RO: that is, reqID, resID, nonce, time, certificateChain, reqInfo and signature. The functions of such parameters have already been described. Here, the <reqInfo> element (or parameter) includes two sub-elements: a user domain ID and an <unauthorized> element. The <unauthorized> element is transferred through the "unauthorized" extension of the <reqInfo> element. In addition, when the RI 200 has an already expired authorization to create and issue the user domain RO or does not have the authorization, and if the DA/DEA 300 sends the RDP Trigger{Drop Domain} message, the RI 200 transfers the <unauthorized> element to the DA/DEA 300 so as to notify that the RI 200 does not have the authorization to create and issue the user domain RO.

Hereinafter, descriptions of the step (S43-2) will be given in detail.

If the DA/DEA 300 has checked (searched) that the <unauthorized> sub-element is included in the <reqInfo> element within the received Drop Domain Request message, the DA/DEA 300 checks (or updates) that the RI 200 does not have authorization to create and issue the corresponding user domain RO. Optionally, the DA/DEA 300 may include the <resInfo> element in the user domain token having been updated with information indicating the expiry of the authorization to create and issue the RO by the RI 200, so as to transfer the same to the RI 200 through the Drop Domain Response message (S43-2).

As another exemplary embodiment, if the Drop Domain Request message has successfully been received or if the status information about the authorization to create and issue the user domain RO of the RI 200 has successfully been checked or updated after receiving the Drop Domain Request message, the DA/DEA 300 transmits a Drop Domain Response message by including a 'status' element (or parameter) set to 'Success' therein. Conversely, if the Drop Domain Request message has not been successfully received or if the status information about the authorization to create and issue the user domain RO of the RI 200 has not been successfully checked or updated, the DA/DEA 300 transmits a Drop Domain Response message by including a 'status' element (or parameter) which is set to 'Fail' therein.

Figure 6:
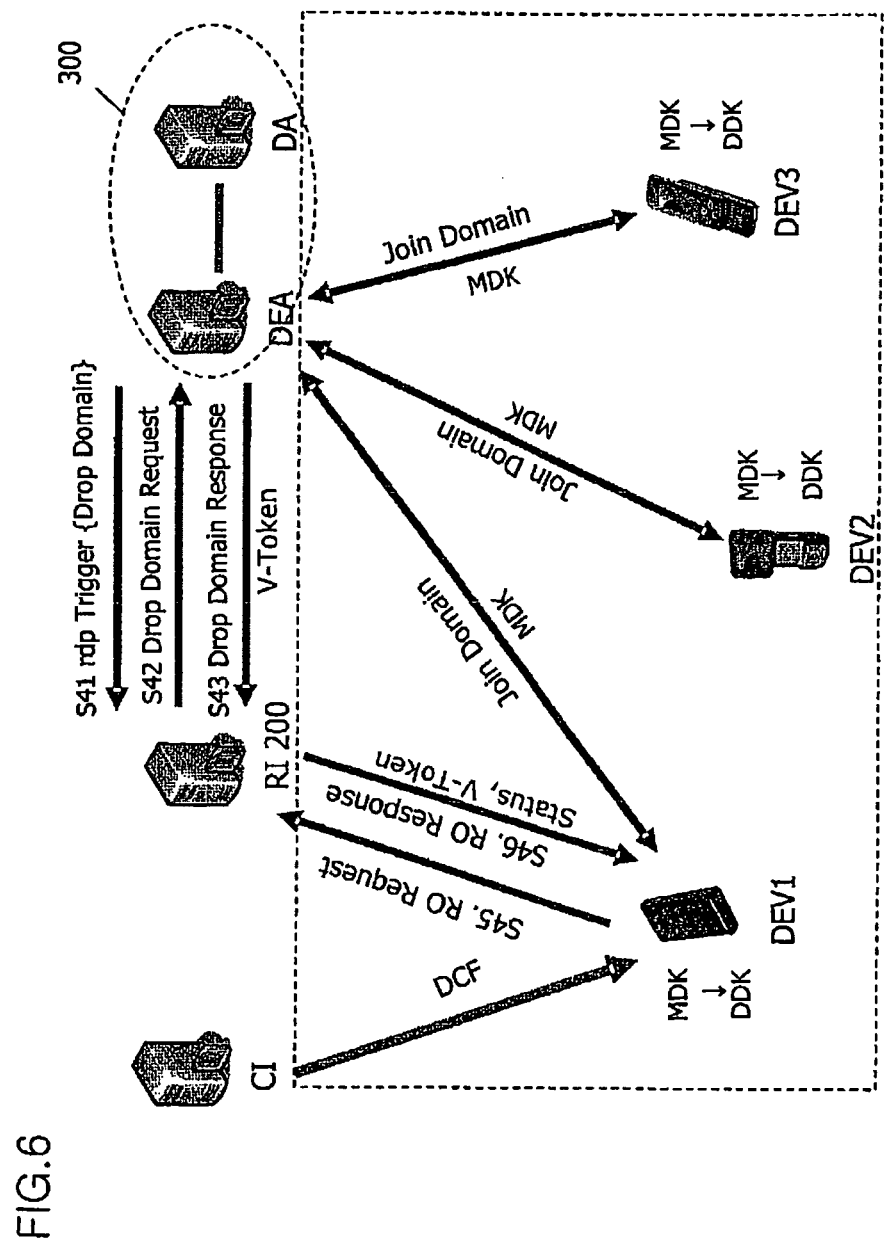
FIG. 6 is a block diagram showing a RDP Drop domain protocol.

FIG. 6 is a block diagram showing a RDP Drop domain protocol. FIG. 6 schematically illustrates signaling of the RDP Drop domain protocol in FIGS. 4 and 5. In FIG. 6, the DA and the DEA are shown as a separate entity, however, the DA and the DEA may be separated from or coupled to each other. Operations of signaling corresponding to each reference numeral in FIG. 6 are the same as those of signaling corresponding to those in FIGS. 4 and 5.

Hereinafter, descriptions of configurations and functions of the DA/DEA according to the present invention will be given in detail.

The DA/DEA according to the present invention includes a module performing the operation and function described in FIGS. 4 through 6. Such module is implemented through software and hardware including the software. In addition, the module may be referred to as a controller or a processor as a component performing the operations and functions described in FIGS. 4 through 6, but such naming is not meant to be limiting.

The module implemented within the DA/DEA according to the present invention performs a newly defined RDP Drop domain protocol. That is, the module sends a trigger message (RDP trigger{Drop Domain}) requesting an initiation (start) of the protocol to a specific entity (e.g., RI having the authorization to issue a domain RO); receives a Drop Domain Request message requesting a termination (stop) of the authorization to issue the domain RO from the entity (RI); searches (analyzes) whether the received request message includes information (i.e., <unauthorized> element within the reqInfo parameter) indicating the presence or absence of the authorization to issue the domain RO in the entity; and based on the search result, sends to the entity (RI) a response message containing information (i.e., user domain token) for updating the authorization to issue the domain RO (i.e., terminating the authorization to issue).

The DA/DEA includes all communication components required to perform the RDP Drop domain protocol with the entity (RI), in addition to the module. The DA/DEA includes a transmitter, an output unit (e.g., a display, a speaker, etc.), an input unit and the like. These components are apparent to those skilled in the related art, thus detailed descriptions therefor are omitted.

Hereinafter, descriptions of the configurations and functions of the RI according to the present invention will be given in detail. The RI may be a device corresponding to a server in a network.

The RI according to the present invention includes a module performing the operations and functions described in FIGS. 4 through 6. This module is implemented through software and hardware including the software. In addition, the module may be referred to as a controller or a processor as a component performing the operations and functions described in FIGS. 4 through 6, but such naming is not meant to be limiting.

The module implemented within the RI according to the present invention performs a newly defined RDP Drop domain protocol. That is, the module receives a trigger message (RDP trigger{Drop Domain}) for requesting an initiation (start) of the protocol from a specific entity (e.g., DEA/DA); sends to the entity (DEA/DA) a Drop Domain Request message containing information indicating the presence or absence of the authorization to issue the domain RO; receives a response message for the request from the entity (DEA/DA) and searches (analyzes) whether or not the response message contains information (i.e., status element within the reqInfo parameter) indicating the presence or absence of the authorization to issue the domain RO; and based on the search result, updates (e.g., terminates the authorization to issue RO) the authorization to issue the domain RO.

In addition, the module (or processor) of the RI receives the Drop Domain Response message so as to check the value (success or fail) of the 'status' element included in the Drop Domain Response message. Here, if the value of the 'status' element is checked to be 'success,' the module of the RI removes the user domain context which includes at least one of the user domain info, the key material and the user domain token.

The RI includes all communication components required to perform the RDP Drop domain protocol with the entity (DEA/DA), in addition to the module. That is, the RI includes a transmitter, an output unit (e.g., a display, a speaker, etc.), an input unit and the like. These components are apparent to those skilled in the related art, thus detailed descriptions therefor are omitted.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for managing an authorization of digital rights, the method comprising:

authorizing, by a second server device, a first server device to have an authorization to create a domain rights object (RO) for a domain which is managed by the second server device;

transmitting, by the second server device, to the first server device, a drop domain authorization trigger message for an initiation of an authorization protocol to cease creating the domain RO for the domain, the drop domain authorization trigger message including information on the domain, wherein the second server device is a Domain Enforce Agent/Domain Authority (DEA/DA), and the information on the domain is an identity (ID) of the domain;

receiving, by the second server device, from the first server device, a drop domain authorization request message including the ID of the domain, a reqID parameter indicating an ID of the first server device, a resID parameter indicating an ID of the second server device, and a signature, wherein the drop domain authorization request message further includes a not-authorized element which indicates that the first server device does not have the authorization for the domain if it is checked that the authorization already has been dropped;

processing, by the second server device, the drop domain authorization request message based on content included in the drop domain authorization request message;

updating, by the second server device, the status of the authorization; and transmitting, by the second server device, to the first server device, a drop domain authorization response message including a status element indicating a result of the second server device processing the drop domain authorization request message.

2. The method of claim 1, in response to a value of the status element indicating a success, indicating that the second server device has successfully received the drop domain authorization request message or that the second server device has successfully checked or updated status information about a function to create and issue a user domain RO of the second server device after receiving the drop domain authorization request message.

3. The method of claim 1, in response to a value of the status element indicating a fail, it indicating that the second server device has failed to receive the drop domain authorization request message or that the second server device has failed to check or update status information about a function to create and issue a user domain RO of the second server device after receiving the drop domain authorization request message.

4. The method of claim 1, wherein the first server device is a Rights Issuer (RI).

5. The method of claim 1, wherein the authorization already has been disabled due to a previous trigger message or an expiration of the authorization.

6. The method of claim 1, wherein the drop domain authorization trigger message further includes at least one of:
 a resID parameter indicating an identity (ID) of the second server device, and
 a reqURL parameter indicating an address of the second server device.

7. The method of claim 1, wherein the drop domain authorization response message includes at least one of:
 a reqID parameter indicating an ID of the first server device,
 a resID parameter indicating an ID of the second server device, and
 a resInfo parameter including information on the domain.

8. A second server device configured to manage an authorization of digital rights, the second server device comprising:
 a hardware processor configured to:
 authorize a first server device to have an authorization to create a domain rights object (RO) for a domain which is managed by the second server device,
 transmit, to the first server device, a drop domain authorization trigger message for an initiation of an authorization protocol to cease creating the domain RO for the domain, the drop domain authorization trigger message including information on the domain,
 wherein the second server device is a Domain Enforce Agent/Domain Authority (DEA/DA), and the information on the domain is an identity (ID) of the domain,
 receive, from the first server device, a drop domain authorization request message including the ID of the domain, a reqID parameter indicating an ID of the first server device, a resID parameter indicating an ID of the second server device, and a signature,
 wherein the drop domain authorization request message includes a not-authorized element which indicates that the first server device does not have the authorization for the domain if it is checked that the authorization already has been dropped;
 process the drop domain authorization request message based on content included in the drop domain authorization request message;
 update the status of the authorization; and
 transmit, to the first server device, a drop domain authorization response message including a status element indicating a result of the second server device processing the drop domain authorization request message.

* * * * *

UNITED STATES PATENT AND TRADEMARK OFFICE
CERTIFICATE OF CORRECTION

| | | |
|---|---|---|
| PATENT NO. | : 9,135,408 B2 | Page 1 of 1 |
| APPLICATION NO. | : 12/372825 | |
| DATED | : September 15, 2015 | |
| INVENTOR(S) | : Youn-Sung Chu et al. | |

It is certified that error appears in the above-identified patent and that said Letters Patent is hereby corrected as shown below:

IN THE CLAIMS:

In claim 2, at column 11, lines 1-2, change "in response to a value of the status element indicating a success, indicating" to --wherein the status element indicating a success indicates--.

In claim 3, at column 11, lines 9-10, change "in response to a value of the status element indicating a fail, it indicating" to --wherein the status element indicating a fail indicates--.

Signed and Sealed this
Second Day of February, 2016

Michelle K. Lee
*Director of the United States Patent and Trademark Office*